US006816984B1

United States Patent
Snyder et al.

(10) Patent No.: US 6,816,984 B1
(45) Date of Patent: Nov. 9, 2004

(54) METHOD AND SYSTEM FOR VERIFYING AND STORING DOCUMENTS DURING A PROGRAM FAILURE

(75) Inventors: Eric Snyder, Bellevue, WA (US); Jeff Larsson, Seattle, WA (US); Bob Coffen, Redmond, WA (US); Kevin Fischer, Sammamish, WA (US); Aleksandr Slepak, Redmond, WA (US); Juha Niemisto, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 09/602,307

(22) Filed: Jun. 23, 2000

(51) Int. Cl.[7] .............................................. G06F 11/00
(52) U.S. Cl. ....................................... 714/38; 707/202
(58) Field of Search ............................. 714/6, 37, 38, 714/39; 717/124, 127, 128; 715/503, 524; 707/202, 200

(56) References Cited

U.S. PATENT DOCUMENTS

| 5,963,641 | A | * | 10/1999 | Crandall et al. ................ 380/2 |
| 5,970,145 | A | * | 10/1999 | McManis ..................... 713/187 |
| 6,067,551 | A | * | 5/2000 | Brown et al. ................ 707/203 |
| 6,230,284 | B1 | * | 5/2001 | Lillevold ...................... 714/13 |
| 6,507,858 | B1 | * | 1/2003 | Kanerva et al. ............. 715/515 |
| 6,567,826 | B1 | * | 5/2003 | Fischer et al. .............. 707/202 |
| 6,675,295 | B1 | * | 1/2004 | Marcelais et al. ............. 713/2 |

* cited by examiner

*Primary Examiner*—Dieu-Minh Le
(74) *Attorney, Agent, or Firm*—Merchant & Gould

(57) ABSTRACT

Method and system for verifying and storing documents during a failure in a program module. Once a failure is detected in the program module, control passes to an exception handler that determines whether the open files have been modified. If so, a crash handler is executed, which verifies and stores the documents by detecting and repairing any discovered corruption. The program module is then terminated and restarted. Upon restarting the program module, the repaired document is opened and displayed to the user with a list of repairs.

18 Claims, 6 Drawing Sheets

METHOD AND SYSTEM FOR VERIFYING AND STORING DOCUMENTS DURING A PROGRAM FAILURE

TECHNICAL FIELD

This invention relates to software program modules. More particularly, this invention relates to a method and system for verifying and storing documents during a failure in a spreadsheet application program.

BACKGROUND OF THE INVENTION

Despite the best efforts of software developers, spreadsheet application programs ("SAPs"), such as the "EXCEL" application program manufactured and sold by Microsoft Corporation of Redmond, Wash., inevitably fail at one time or another. For example, network connectivity problems, viruses, and anti-virus software may cause failures in a SAP. Unhandled failures may result in a crash, at which time the operating system terminates the application program execution. When a program crashes, all of its state data is lost. As a result, users that were in the process of modifying a spreadsheet, may lose substantial amounts of information. Information loss may create a significant amount of work and frustration to users.

To minimize the information lost as a result of a crash, different approaches have been taken. For example, one prior art method comprises performing a normal save of the open document immediately after a failure is detected as if the failure never occurred.

Attempting to save the document after a failure, however, can often cause another failure while saving the document. If the save attempt is unsuccessful then the modified changes in the document are lost and no other attempt is made to recover the information. Furthermore, even if the save attempt is successful, the document may include corruption that prevents the application program in which the failure occurred from reopening the document.

Because the application program may not be able to open corrupt files, the user may still lose substantial amounts of work. Therefore, unless the open files are repaired before they are saved to non-volatile memory, merely saving the files after a failure in the SAP may not provide any benefit to the user.

Accordingly, there is a need for a method and system for saving the

There is also a need for a method and system for verifying the contents of an open file to determine whether the file has been corrupted, possibly as a result of the same problems that led to the application failure.

There is still an additional need for a method and system for verifying the contents of an open file that is sufficiently robust to recover information from severely corrupt files.

SUMMARY OF THE INVENTION

The present invention satisfies the above-described needs by providing a method and system for verifying and storing documents during a program failure. A crash handler is provided that verifies and performs an emergency save of any file that is open at the time of the crash.

Once a failure of the program module is detected, control passes to an exception handler, which instructs the operating system to execute the crash handler. The crash handler attempts to repair and store all open files that have been modified. When the program is restarted, the repaired files are loaded and displayed to the user with a list of any repairs.

More particularly, once a failure occurs in an application program module, the operating system passes control to the exception handler, which may display a user interface, such as a dialog box, asking the user whether any open files should be saved.

If the user selects to save the open files, then a determination is made whether the open file has been modified from the version currently saved to disk. If so, the exception handler instructs the operating system to execute the crash handler.

After assuming control, the crash handler examines each file for evidence of corruption. The term corruption is used generally to include any type of error ranging from missing end-of-file markers and illegal names for sheets or ranges, to missing PivotTable report supporting records or corrupt OLE storage structures.

If corruption is found, the crash handler determines whether the errors are repairable. Repairs may include making changes to the file such as renaming sheets or removing parts of the file that contain the errors.

The extent of information recovered by the crash handler depends on the extent the file could be repaired. For example, in accordance with one embodiment of the present invention, if it is determined that the file is so badly damaged that it can not be repaired, the crash handler may not attempt to save the file at all. If, on the other hand, it is determined that the file is not corrupt or that be saved normally, i.e., full normal save.

Alternatively, if the file is determined non-repairable (but not so badly damaged to abort the save), the crash handler attempts to save only the formulas and values of each document's cell table. All other features such as formatting, Visual Basic for Applications macro programs ("VBA projects"), embedded OLE objects, charts, and PivotTable reports are discarded.

Finally, if the crash handler determines the application program module is in such an unstable state that it may not safely save any files, all saves are aborted. In any case, if repairs are made to a file, a list of all changes is saved with the file, which permits a user to view the changes after the repaired file is reopened in a new instance of the program module.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

DETAILED DESCRIPTION

Figure 1:
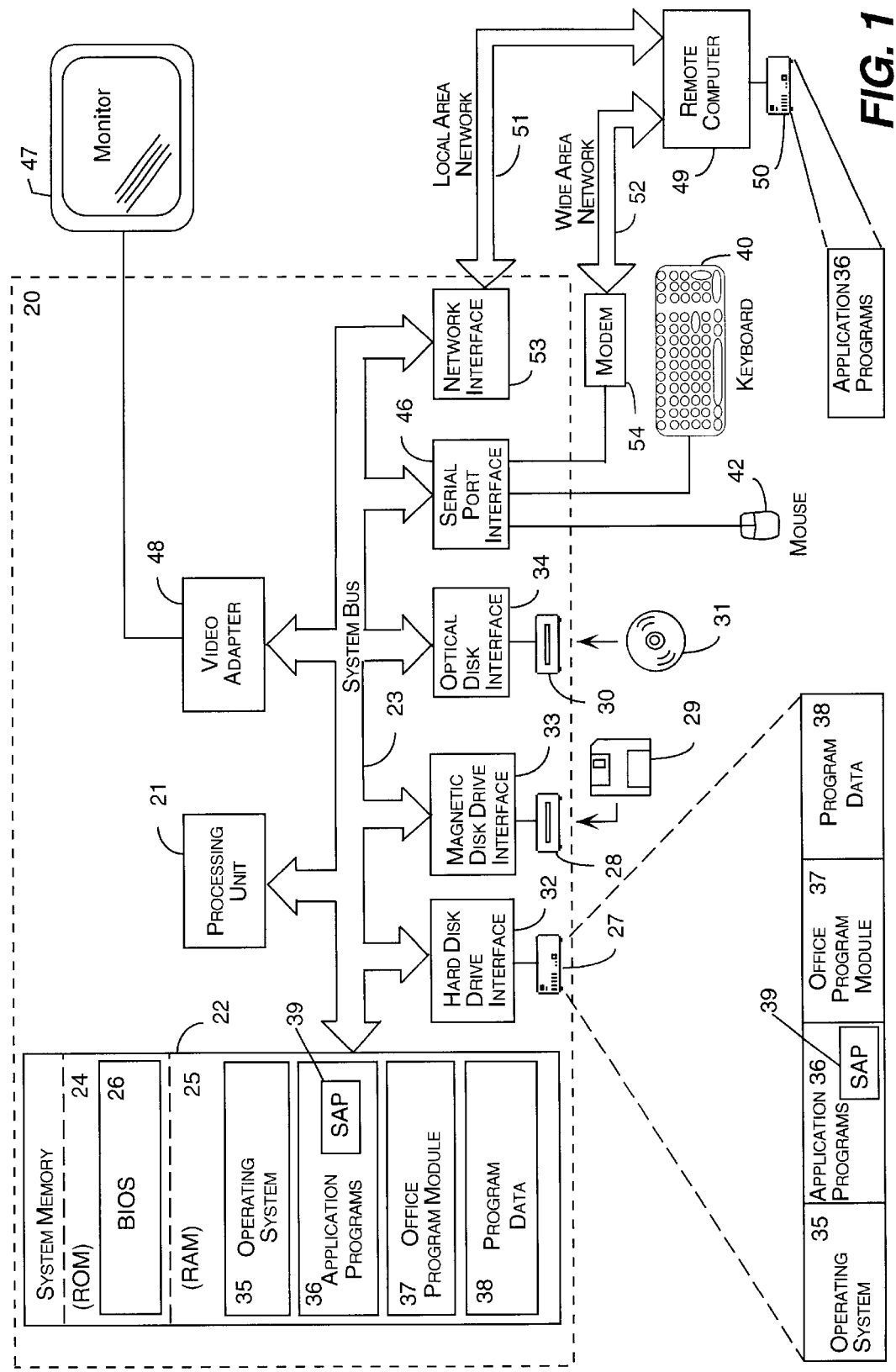
FIG. 1 is a block diagram of a computer that provides the exemplary operating environment for the present invention.

The present invention is directed to a method and system of verifying and storing spreadsheet documents during a program failure. Unhandled failures may lead to a crash, at which time the program may be terminated by the a result, users that were in the process of modifying one or more files may lose substantial amounts of information.

The present invention provides a crash handler that attempts to minimize the amount of information that is lost as a result of a crash. When an exception occurs, the crash handler allows a user to attempt an emergency save of all open files. Before the crash handler attempts to save the files, the crash handler first determines whether the files require any repairs and, if so, attempts to repair the files. According to the extent the files are repairable, the files are then stored for subsequent viewing in a new instance of the program.

In one embodiment, the invention is incorporated into a spreadsheet application program module, such as the "EXCEL" program manufactured and sold by Microsoft Corporation of Redmond, Wash. While the invention will be described in the specific context of the "EXCEL" program module running in conjunction with a personal computer, those skilled in the art will recognize that the invention may also be implemented with other spreadsheet application program modules.

Having briefly described an embodiment of the present invention, an illustrative operating environment for the present invention is described below.

Illustrative Operating Environment

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be With reference to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35, an "OFFICE" program module 37, program data 38, other program modules (not shown), and one or more application programs 36, such as an "EXCEL" program module 39.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

System for Verifying and Storing Documents During a Program Failure

In one embodiment, the present invention is a system for verifying and storing information subsequent to a program module failure. An exception handler, such as the Global Unhandled Exception Filter, is included in the program module. An exception handler is a block of code that takes control, or executes, in the event of a failure, or unexpected exception.

Those skilled in the art should appreciate that a program module may have many (or no) layers of exception handlers. Because different exception handlers may apply to different ranges of execution, the operating system will turn to particular exception handlers depending on the particular exception. When no exception handler chooses to deal with an exception, the exception is handed to the Global Unhandled Exception Filter, provided the application had registered such a handler at some prior point in its current execution. This handler is the last line of defense for all exceptions, regardless of where they may occur in the program.

In the event of such an exception, control is passed to the exception handler. The exception handler then instructs the operating system to execute a crash handler. Those skilled in the art should appreciate that a crash handler may be understood to be a specialized exception handler. After assuming control, the crash handler verifies the file(s) and saves the file(s) to a persistent medium, such as disk drive 27 (FIG. 1). Once the program is restarted, the user is allowed to view the file(s) and a list of respective repairs, if any. 200 for verifying and storing documents during a program failure in accordance with an embodiment of the present invention will be described. The system 200 comprises a spreadsheet application program module 205. For example, application program module 205 may be the "EXCEL" spreadsheet application program module 39 (FIG. 1), manufactured and sold by Microsoft Corporation of Redmond, Wash. and included in the "OFFICE" 37 (FIG. 1) suite of program modules.

The system 200 further comprises an executable program (not shown) running inside of application program module 205. For example, in the "EXCEL" spreadsheet application program module, the executable program may be "Excel.exe". An executable program is a program that can be run and typically means a compiled program translated into machine code in a format that can be loaded into memory and run by a computer's processor.

The system 200 further comprises a module (not shown) being executed by the executable program inside the application program module 205 at the time of the failure. The module may refer to a collection of routines and data structures that performs a particular task or implements a particular abstract data type. Modules usually comprise two parts: an interface, which lists the constants, data types, variables, and routines that can be accessed by other modules or routines, and an implementation, which is private (accessible only to the module) and which contains the source code that actually implements the routines in the module. For example, the module may be a dynamic-link library such as "mso.dll".

While system 200 is described above using source code, those skilled in the art should appreciate that the method and/or layout of a module's source code are not relevant to the exception handler's ability to handle the exception. The present invention can be used to handle exceptions generated by any executable code, regardless of whether it is well-written in a high-level programming language (as described above) or if it is hand-written directly into machine code. Furthermore, those skilled in the art should also appreciate that not only may the exception occur in the application program that contains the exception handler, it may alternatively occur in any code that the exception handler calls, including code that resides in the operating system. For example, various operating system functions, such as Windows APIs, may, under certain circumstances, raise exceptions.

Referring back to FIG. 2, the system 200 also comprises an exception handler 220. Several exception handling techniques are well known in the art and may be employed locally or globally within an executable program. When a executed.

The reader should appreciate that a program raises an exception whenever the program attempts something unexpected or illegal. For example, suppose a failure occurs while an executable program is executing instructions running a module. If executable program has an exception handler in place, then the exception handler is executed when the executable program encounters the exception.

A crash may be defined as a failure or exception generated by the program module that is not handled by the program module. In other words, if no exception handlers exist or none of the program's exception handlers choose to handle the particular exception, the operating system then deals with the exception. Typically, in prior art methods, the operating system shows the user a "crash" dialog and then terminates the program.

Those skilled in the art should appreciate that in the present invention, control is passed to the exception handler 220 before the program crashes. In one embodiment of the present invention, the exception handler 220 is included in the application in order for control to be given to it in the event of an exception. It is preferable for the data recovery to be completed inside of the application because another application would not have access to, nor understanding of, the application data. Those skilled in the art should appreciate, however, that the exception handler 220 may also be implemented separately from the application program module 205 because of the possible instability of the application program module (having experienced a failure).

Referring back to FIG. 2, the system 200 also comprises a crash handler 225 and an operating system 230. The operating system 230 is the master control program that runs the computer, such as the "WINDOWS 98" operating system manufactured and sold by Microsoft Corporation of Redmond, Wash. Once the exception handler 220 is executed, the exception handler 220 instructs the operating system 230 to execute the crash handler 225. Those skilled in the art should appreciate that passing control to the crash handler 225, allows the exception handler 220 to catch additional failures should they occur while crash handler 225 attempts to verify the file. In one embodiment of the present invention, the crash handler 225 is preferably included in the application program.

Once control is passed to the crash handler 225, it examines each file for evidence of corruption. The term corruption is used generally to include any type of error ranging from missing end-of-file markers and illegal names for sheets or ranges, to corrupt OLE storage structures. errors are repairable. Repairs may include making changes to the file such as renaming sheets or removing parts of the file that contain the errors.

The reader should appreciate that the extent of information recovered by the crash handler 225 depends on the extent the file can be repaired. For example, in accordance with one embodiment of the present invention, if it is determined that the file is so badly damaged that that it can not be repaired, the crash handler 225 may not attempt to save the file at all. If, on the other hand, it is determined that the file is not corrupt or that the file is corrupt but the crash handler 225 was able to repair the error(s), the file may be saved normally, i.e., full normal save.

Alternatively, if the file is determined irreparable (but not so badly damaged to abort the save), the crash handler 225 attempts to save only the formulas and values of each table. All other features such as formatting, VBA projects, embedded OLE objects, charts, and PivotTable reports are discarded.

Finally, if the crash handler 225 determines the application program module 205 is in such an unstable state that it may not safely save any files, all saves are aborted. In any case, if repairs are made to a file, a list of all changes is saved with the file, which permits a user to view the changes after the repaired file is reopened in a new instance of the program module 205.

Having described the system 200 for verifying and storing information during a program module crash in accordance with an embodiment of the present invention, an exemplary method 300 will be described in reference to FIG. 3.

Figure 2:
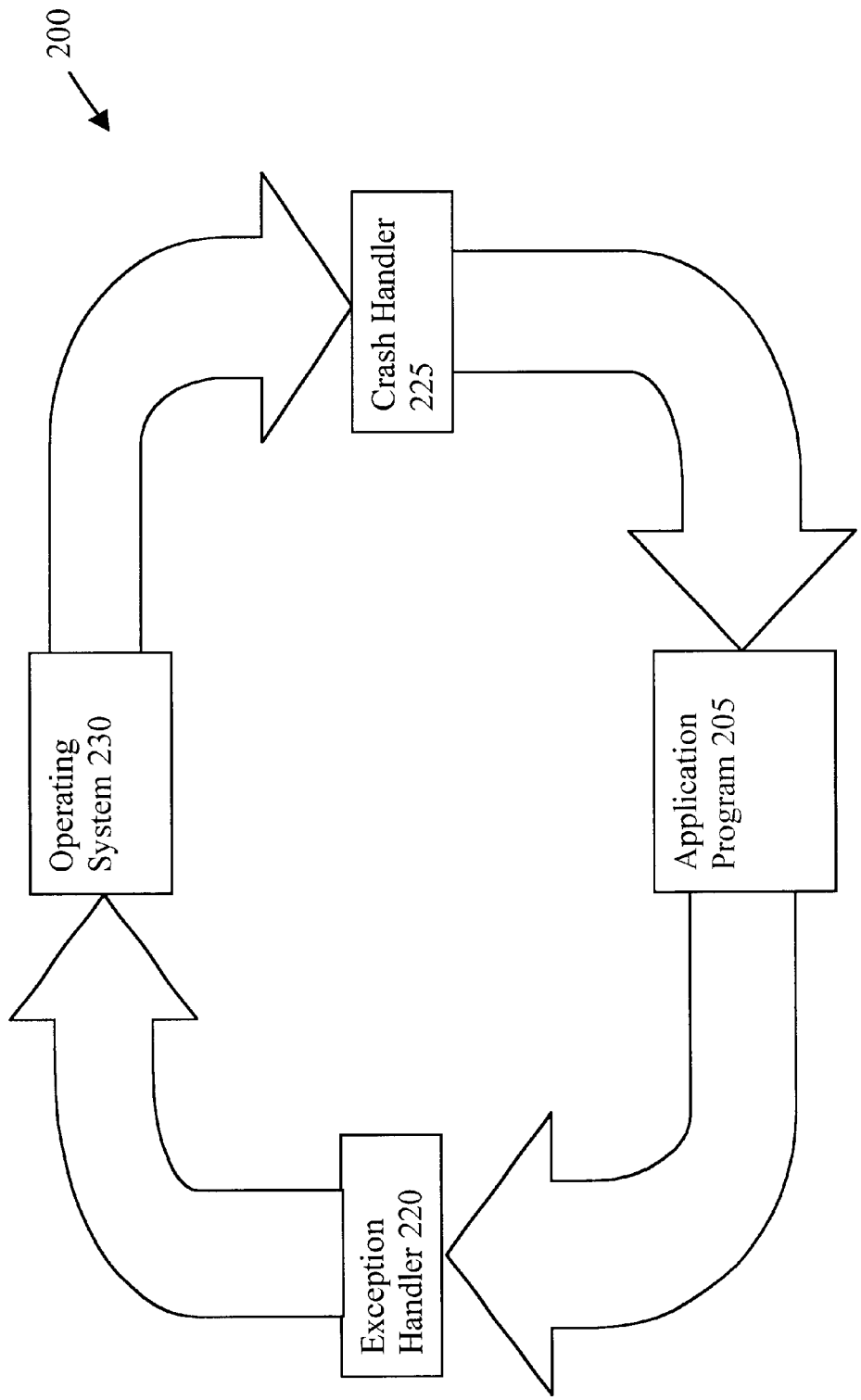
FIG. 2 is a component block diagram of an exemplary system for verifying and storing documents during a program failure in accordance with an embodiment of the present invention.
Figure 3:
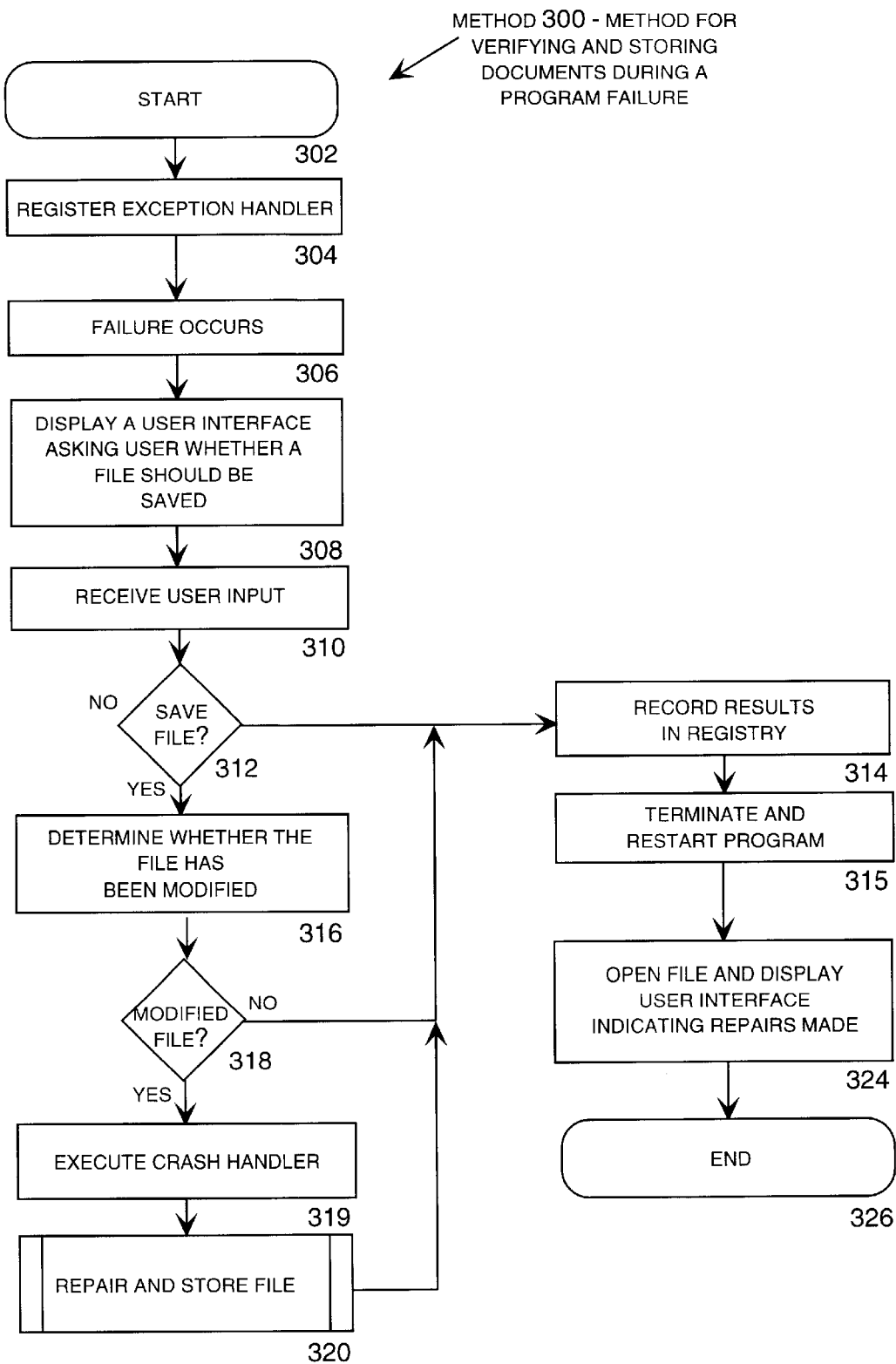
FIG. 3 is a flowchart illustrating an exemplary method for verifying and storing documents during a program failure in accordance with an embodiment of the present invention.

FIG. 3 is a flowchart illustrating an exemplary method 300 for verifying and storing documents during a program failure in accordance with an embodiment of the present invention. The method 300 will be described with reference to the elements of system 200 (FIG. 2).

Method 300 starts at step 302 and proceeds to step 304, where an exception handler 220 is registered with the operating system 230. In one embodiment of the present invention, the exception handler is a Global Unhandled Exception Filter.

From step 304, method 300 proceeds to step 306, where a failure occurs in the application program module 205.

Method 300 then proceeds to step 308, where control is passed to the exception handler 220, which displays a user interface, such as a dialog box, asking the user whether an open file should be saved. The reader should appreciate that alternate embodiments of the present invention may opt to recover data without confirmation from the user, and possibly without any user interface. method 300 is described with a single open file, the present invention may be used to recover information from multiple open files. In one embodiment of the present invention, if more than one file requires verification then all files are verified before any one file is stored. This is because one file may contain severe corruption that would make it impossible for the application program 205 to store any of the files.

Referring back to FIG. 3, from step 308, method 300 then proceeds to step 310. At step 310, the exception handler 220 receives the user input, and method 300 continues to decision block 312.

At decision block 312, if the user chooses not to save the open file, method 300 branches to step 314, where the exception handler 220 records the results in a registry. Those skilled in the art should appreciate that a registry is a database that holds configuration data about the hardware and environment of the computer.

If at decision block 312, however, the user chooses to save the open file, then method 300 continues to step 316, where a determination is made whether the open file has been modified. Specifically, the exception handler 220 determines whether the open file contains information that is unlike either the original saved version or the most recent auto-saved version. From step 316, method 300 continues to decision block 318.

If at decision block 318 the exception handler 220 determines the file has not been modified, method 300 branches to step 314, where the exception handler records the results in the registry.

If, on the other hand, the exception handler 220 determines that the file has been modified, method 300 continues to step 319, where the exception handler 220 instructs the operating system to execute the crash handler 225.

From step 319, method 300 proceeds to step 320, where the crash handler 225 verifies the open file and attempts to store the file on disk or some other persistent medium. A method 600 for verifying files by detecting and repairing any discovered errors in the file will be described in more detail with reference to FIG. 6 below.

Method 300 then proceeds to step 314, where the crash handler 225 records the results in the registry 230. From step 314, method 300 proceeds to step 315, where the program module 205 is terminated and restarted. Method 300 then continues to step 324.

At step 324, the repaired file is opened in the new instance of the program 205, and a user interface, such as a dialog box, may be displayed to the user indicating what errors were detected in the file and what repairs were made, embodiment of the present invention will be described in more detail below with reference to FIGS. 4 and 5.

From step 324, method 300 proceeds to step 326, where it ends.

Figure 4:
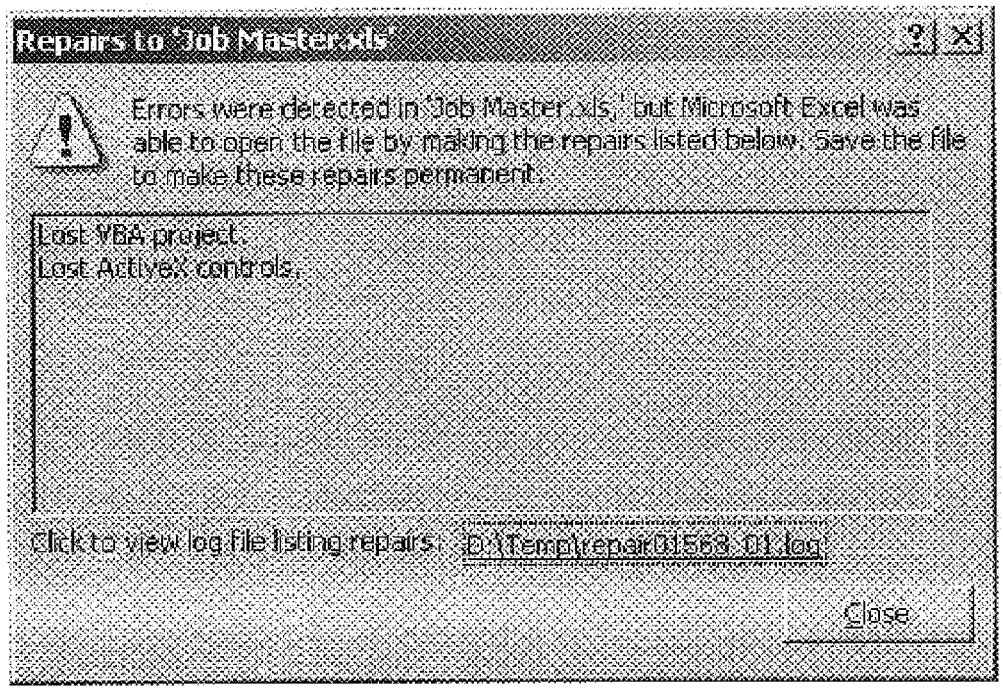
FIGS. 4 and 5 are screen shots illustrating exemplary user interfaces for indicating what errors and repairs were made on a document in accordance with an embodiment of the present invention.
Figure 5:
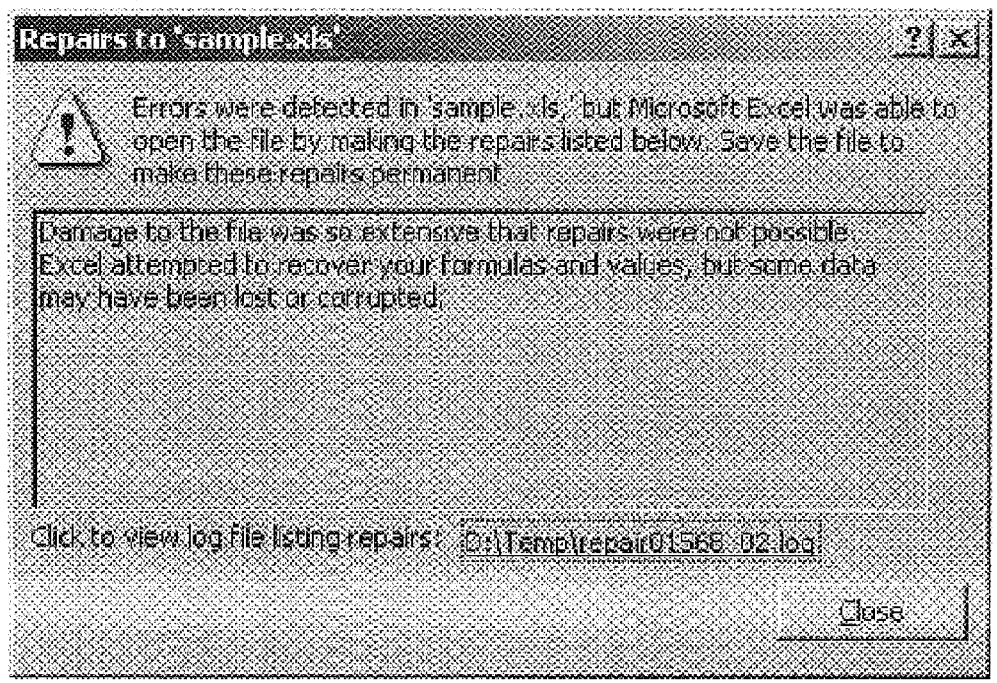

Referring now to FIGS. 4 and 5, illustrative display screens 400 and 500 are shown. The display screen 400 is an illustrative user interface that may be displayed to a user when an open file has been successfully repaired and stored. Alternatively, the display screen 500 is an illustrative user interface that may be displayed to the user when an open file could not be successfully repaired or stored.

In either case, both display screens 400 and 500 include a number of visual elements. For example, the screens may comprise a text message area 402, 502 displaying the actions taken on a file, a data display box 404, 504 listing the repairs made to the file, if any, and a hypertext link 406, 506 allowing a user to view more detailed descriptions of the repairs, if any.

Figure 6:
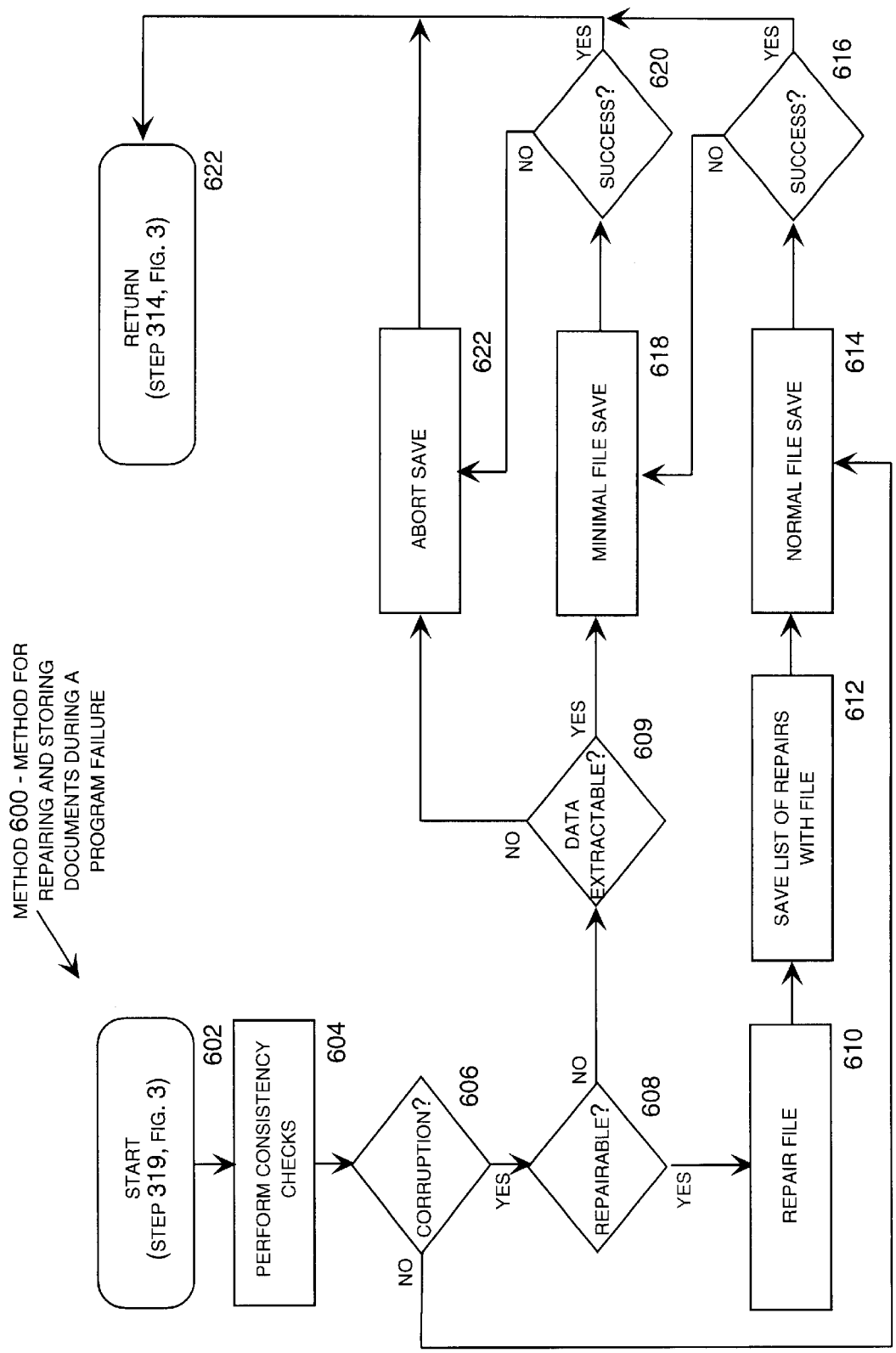
FIG. 6 is a flowchart illustrating an exemplary method for repairing and storing documents during a program failure in accordance with an embodiment of the present invention.

Referring now to FIG. 6, an illustrative method 600 for repairing and storing a document in accordance with an embodiment of the present invention will be described. The method 600 will also be described with reference to the elements of system 200 (FIG. 2).

Method 600 begins from step 316 (FIG. 3) and proceeds to step 604, where the crash handler 225 performs consistency checks on the open file. In one embodiment of the present invention, consistency checks comprise resolving the data structures of common functions such as workbook names, Active X controls, VBA projects, macro viruses, record sizes, PivotTable report information, end of file markers, and invalid name ranges. Those skilled in the art should appreciate that consistency checks are function specific. In other words, each function requires a check that is unique to that function.

For example, in conducting the above checks, the crash handler 225 may determine if the workbook names are valid by checking whether the name lengths are correct, the workbook names contain null characters, and/or the file contains duplicate workbook names. The crash handler 225 may also check the record size to determine if the record size is within a predetermined record size range. In addition, the crash handler 225 may check the file's PivotTable reports to determine if there is supporting record information in the file. Those skilled in the art should appreciate that other functions may require different types of consistency checks.

From step 604, method 600 continues to decision block 606, where the crash handler 225 determines whether any evidence of corruption exists in the file. begins performing the consistency checks from the function in operation when the failure occurred, if known. Those skilled in the art will appreciate that functions may have markers, known as setjmps, usually near the top of the function. In the event of an unforeseen event such as a crash or out-of-memory failure, functions having setjmps return execution to the marker. Those skilled in the art should further appreciate that the function in operation when the failure occurred has a greater probability of containing corruption that may have been the cause of the failure.

After cleaning up the function in operation when the failure occurred, if known, the crash handler 225 then performs consistency checks on the rest of the file. The reader should appreciate that while the illustrative method 600 is described with a single open file, the present invention may be used to recover information from multiple open files. In one embodiment of the present invention, if more than one file requires verification, then consistency checks are performed on all files before any one file is stored.

If, at decision block 606, no corruption is found then method 600 branches to step 614, where the crash handler 225 instructs the program module 205 to attempt a normal save of the file.

If, on the other hand, corruption is discovered in the file, method 600 continues to decision block 608, where the crash handler 225 determines whether the discovered corruption is repairable. If so, method 600 proceeds to step 610, where the file is repaired.

File repair may include both repairing and/or removing corruption. For example, the crash handler 225 may remove charts or PivotTable report caches, rename workbooks, or reset internal variables. In general, the crash handler 225 removes the parts of the file that are corrupt and then opens the remaining parts of the file that are intact. From step 610, method 600 continues to step 612.

At step 612, crash handler 225 saves a list of all repairs completed. Method 600 then proceeds to step 614, where the crash handler 225 instructs the program module 205 to attempt a normal save of the file.

From step 614, method 600 proceeds to decision block 616, where the crash handler 225 determines whether the file was saved successfully. If so, method returns to step 314 (FIG. 3).

If, however, the file could not be saved successfully, method 600 branches to step 618, where the crash handler 225 instructs the program module 205 to attempt a minimal save of the file. As described above, during a minimal save, only the formulas (including their dependencies such as external references, such as formatting, defined styles, VBA projects, embedded OLE objects, charts, PivotTable reports, and the current selection are either discarded or reduced to the absolute minimal state that is required to create a valid file.

From step 618, method 600 proceeds to decision block 620, where the crash handler 225 determines whether the minimal file save was successful. If so, method returns to step 314 (FIG. 3).

If, however, the minimal file save was unsuccessful, method 600 branches to step 622, where the crash handler 225 instructs the program module 205 to abort saving the file. Those skilled in the art should appreciate that the method described by steps 614, 616, 618, 620, and 622 provides the program module 205 robustness to handle severe corruption that causes multiple failures.

Returning now to decision block 608, if the crash handler 225 determines the discovered corruption is not repairable, then method 600 branches to decision block 609, where a determination is made whether the internal data may be safely extracted. If so, method 600 continues to steps 618 and 620 as described above.

If, however, it is determined that an attempt to extract the internal data would cause another failure, then method 600 branches to step 622, where the crash handler 225 instructs the program module 205 to abort saving the file. In one embodiment of the present invention, the determination of whether a normal file save or a minimal file save is successful comprises passing control to the program module 205, which attempts to complete the appropriate save. If the attempted save is unsuccessful then the subsequent failure is caught by the exception handler 220, which instructs the operating system 230 to execute the crash handler 225. Based on internal information stored during the first attempted save, the crash handler 225 then performs the next save (e.g., minimal file save or aborted save).

Referring still to FIG. 6, from step 622, method 600 returns to step 314 (FIG. 3).

Although the present invention has been described above as implemented in a preferred spreadsheet application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for verifying and storing at least one document during a failure in a spreadsheet application program module, the method comprising the steps of:

determining there is a failure in the spreadsheet application program module;

in response to a determination that there is a failure in the spreadsheet application program module, determining there is corruption in the document;

in response to a determination that there is corruption in the document, repairing the corruption in the document, wherein repairing the corruption in the document comprises at least one of removing charts, renaming workbooks, and resetting internal variables; and storing the at least one document.

2. The method of claim 1, further comprising the steps of:

terminating the spreadsheet application program module;

restarting the spreadsheet application program module; and displaying the at least one document.

3. The method of claim 1, further comprising the steps of:

displaying a user interface requesting instructions from a user regarding whether the at least one document should be saved; and receiving instructions from the user to save the at least one document.

4. The method of claim 1, wherein the steps of determining and repairing corruption further comprise performing consistency checks.

5. The method of claim 4, wherein the step of performing consistency checks begins at a function in operation at the time of the failure.

6. The method of claim 1, wherein the step of storing the at least one document comprises the steps of:

attempting a normal file save of the at least one document;

in response to failing the normal file save, attempting a minimal file save of the at least one document; and in response to failing the minimal file save, aborting the file saves.

7. The method of claim 6, further comprising the step of aborting all document saves in response to determining the spreadsheet application program module is in an unstable state.

8. A system for verifying and storing at least one document during a failure in a spreadsheet application program module on a user's computer comprising:

an exception handler residing on the user's computer for detecting a failure in the spreadsheet application program module and instructing an operating system to execute a crash handler;

a crash handler residing on the user's computer for detecting and repairing corruption found in the at least one document and storing the at least one document, wherein repairing the corruption in the document comprises at least one of removing charts, renaming workbooks, and resetting internal variables.

9. The system of claim 8, wherein the exception handler is a Global Unhandled Exception Handler that may be easily added to the software program without extensive changes to the program's architecture.

10. The system of claim 8, wherein the exception handler further executes the steps of:

displaying a user interface requesting instructions from a user regarding whether the at least one document should be saved; and receiving instructions from the user to save the at least one document.

11. The system of claim 10, wherein the crash handler further executes the steps of:

attempting a normal file save of the at least one document;

in response to failing the normal file save, attempting a minimal file save of the at least one document; and in response to failing the minimal file save, aborting the file saves.

12. A computer-readable medium for verifying and storing at least one document during a failure in a spreadsheet application program module, having computer-executable instructions for performing the steps of:

determining there is a failure in the spreadsheet application program module;

in response to a determination that there is a failure in the spreadsheet application program module, detecting and repairing corruption in the document, wherein repairing the corruption in the document comprises at least one of removing charts, renaming workbooks, and resetting internal variables; and storing the at least one document.

13. The computer-readable medium of claim 12, further comprising the steps of:

terminating the spreadsheet application program module;

restarting the spreadsheet application program module; and displaying the at least one document.

14. The computer-readable medium of claim 12, further comprising the steps of:

displaying a user interface requesting instructions from a user regarding whether the at least one document should be saved; and receiving instructions from the user to save the at least one document.

15. The computer-readable medium of claim 12, wherein the step of detecting and repairing corruption comprises performing consistency checks.

16. The computer-readable medium of claim 15, wherein the step of performing consistency checks begins at the function in operation at the time of the failure.

17. The computer-readable medium of claim 12, wherein the step of storing the at least one document further comprises the steps of:

attempting a normal file save of the at least one document;

in response to failing the normal file save, attempting a minimal file save of the at least one document; and in response to failing the minimal file save, aborting the file saves.

18. The computer-readable medium of claim 17, further comprising the step of aborting all document saves in response to determining the spreadsheet application program module is in an unstable state.

* * * * *